United States Patent
Oh (10) Patent No.: US 7,600,196 B2
(45) Date of Patent: Oct. 6, 2009

(54) METHOD FOR SORTING AND DISPLAYING SYMBOLS IN A MOBILE COMMUNICATION TERMINAL

(75) Inventor: Dong Hyuck Oh, Incheon (KR)

(73) Assignee: LG Electronics, Inc., Seoul (KR)

( * ) Notice: Subject to any disclaimer, the term of this patent is extended or adjusted under 35 U.S.C. 154(b) by 560 days.

(21) Appl. No.: 10/886,186

(22) Filed: Jul. 6, 2004

(65) Prior Publication Data

US 2005/0003868 A1 Jan. 6, 2005

(30) Foreign Application Priority Data

Jul. 4, 2003 (KR) ...................... 10-2003-0045124

(51) Int. Cl.
*G06F 3/048* (2006.01)

(52) U.S. Cl. ........................ 715/816; 715/789; 715/810; 715/811; 715/864; 715/866

(58) Field of Classification Search .................. 715/816, 715/789, 810, 811, 864, 866
See application file for complete search history.

(56) References Cited

U.S. PATENT DOCUMENTS

| | | | | |
|---|---|---|---|---|
| 6,487,424 | B1 * | 11/2002 | Kraft et al. | 455/566 |
| 6,621,424 | B1 * | 9/2003 | Brand | 341/22 |
| 6,734,881 | B1 * | 5/2004 | Will | 715/811 |
| 7,007,233 | B1 * | 2/2006 | Iwayama | 715/258 |
| 7,091,885 | B2 * | 8/2006 | Fux et al. | 341/22 |
| 2003/0197736 | A1 * | 10/2003 | Murphy | 345/780 |
| 2004/0070621 | A1 * | 4/2004 | Suzuki et al. | 345/764 |
| 2004/0153975 | A1 * | 8/2004 | Williams et al. | 715/531 |

* cited by examiner

*Primary Examiner*—Weilun Lo
*Assistant Examiner*—Rashedul Hassan
(74) *Attorney, Agent, or Firm*—Lee, Hong, Degerman, Kang & Waimey (57) ABSTRACT

A system for arranging symbols for display and selection in a mobile communication terminal is provided. The system comprises user interface configured for selecting a first symbol having a first display priority; and means for assigning a second display priority to a second symbol associated with the first symbol, wherein the second symbol is displayed according to the second display priority, in response to a request for displaying a symbol set.

28 Claims, 6 Drawing Sheets

METHOD FOR SORTING AND DISPLAYING SYMBOLS IN A MOBILE COMMUNICATION TERMINAL

CROSS-REFERENCE TO RELATED APPLICATIONS

Pursuant to 35 U.S.C. § 119(a), this application claims the benefit of earlier filing date and right of priority to Korean Patent Application No. 2003-45124, filed on Jul. 4, 2003, the content of which is hereby incorporated by reference herein in its entirety.

BACKGROUND

1. Field of the Invention

The invention relates to a mobile communication terminal, and more particularly, to a method of sorting display symbols in a mobile communication terminal.

2. Discussion of the Related Art

Short messaging service (SMS) is a service that provides a mobile user with the capability to communicate with another mobile user in written format. In addition to text symbols, such as numbers and alphabet, many users now also include other symbols in their messages. These symbols can range from graphic icons to special symbols used in financial or accounting services, as shown in FIGS. 1A through 1D.

In the current systems, in order to enter a symbol into a message, a user first selects a symbol input menu. The menu includes a multitude of symbols that are selectable by way of a user interacting with a direction key. When the symbol is selected, the user can press a key to input the symbol into the content of the message being edited at that time.

Various symbols can be classified according to their features. Thus, when a user intends to input a specific symbol, the symbols can be displayed according to a set of selectable categories. FIGS. 1A to 1D are diagrams of various categories of symbols in form of icons or emoticons that can be selected. Other types or categories of symbols may be stored in a memory of the mobile terminal.

In order to access a particular symbol, a user will have to load the specific symbol set or category in which the symbol is displayed. When the number of symbols or categories is rather large, the burden is on the user to browse through the multiple sets and categories to find the needed symbol. This can be very inconvenient, especially if the user tends to use a few symbols more often than all the other symbols.

That is, the user will have to continuously browse through the symbol sets in order to find the category containing the most often used symbols. A system and method is needed that can allow a user to more easily access and select the most often used symbols.

SUMMARY OF THE INVENTION

A method of arranging symbols for display on a computing device is provided. The method comprises selecting a first symbol having a first display priority; and assigning a second display priority to a second symbol associated with the first symbol, wherein the second symbol is displayed according to the second display priority, in response to a request for displaying a symbol set.

In one embodiment, the second symbol is a symbol most frequently selected in association with the first symbol. The first and second symbols are frequently selected in sequence to convey a meaning. The second symbol is associated with the first symbol based on use history of the first and second symbols together.

The second symbol is associated with the first symbol based on serial reference values assigned to the first and second symbols. The second symbol's display priority is closely associated with the first symbol's display priority, when the second symbol is selected after the first symbol. A symbol set is displayed containing the second symbol, in response to a request for selecting another symbol.

In one embodiment, the second display priority is a highest display priority in the symbol set. The first display priority is a highest display priority in the symbol set, when the second symbol is selected. A priority category may comprise the first and second symbols. A first symbol set with a first priority category is displayed, in response to a request for selecting a symbol when the mobile communication terminal is used to access a first service.

In another embodiment, a mobile communication terminal for displaying a plurality of symbol sets is provided. Each set comprising a plurality of symbols in a category. A method for arranging the plurality of symbols comprises configuring one or more priority categories; assigning a first priority category to a first symbol based on use history of the first symbol; and displaying symbols assigned to the first category, when the first symbol is selected, in response to a request to select a second symbol.

The first symbol is added to a first symbol set based on the first priority category. The method may further comprise adding a second symbol associated with the first symbol to the first symbol set. The second symbol is displayed in a most prominent position in the first symbol set. The second symbol is associated with the first symbol by way of a serial reference value that is closely related to a serial reference value for the first symbol.

In one embodiment, the second symbol is assigned to a priority position in the first symbol set, wherein the second symbol is displayed in a more prominent position than the first symbol. The second symbol may be assigned to a priority position higher than that of the first symbol. The first symbol set comprises a plurality of symbols associated with each other based on use history. When the first symbol is selected from the first symbol set, the remaining symbols in the symbol set are sorted to be displayed in a more prominent position with respect to use history of each remaining symbol in conjunction with the first symbol.

In accordance with one embodiment, a system for arranging symbols for display and selection in a mobile communication terminal is provided. The system comprises user interface configured for selecting a first symbol having a first display priority; and means for assigning a second display priority to a second symbol associated with the first symbol, wherein the second symbol is displayed according to the second display priority, in response to a request for displaying a symbol set.

These and other embodiments of the invention will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments of the system.

DETAILED DESCRIPTION OF THE PREFERRED EMBODIMENTS

Figure 1A:
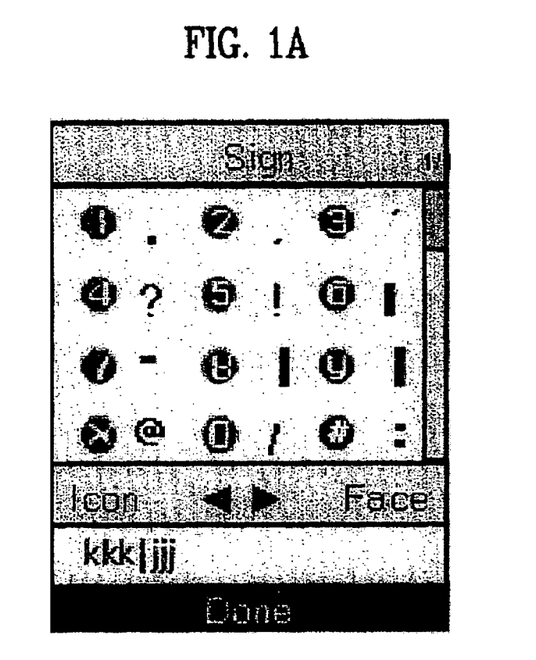
FIGS. 1A to 1D illustrate exemplary symbols provided by a symbol menu in a mobile terminal.
Figure 1B:
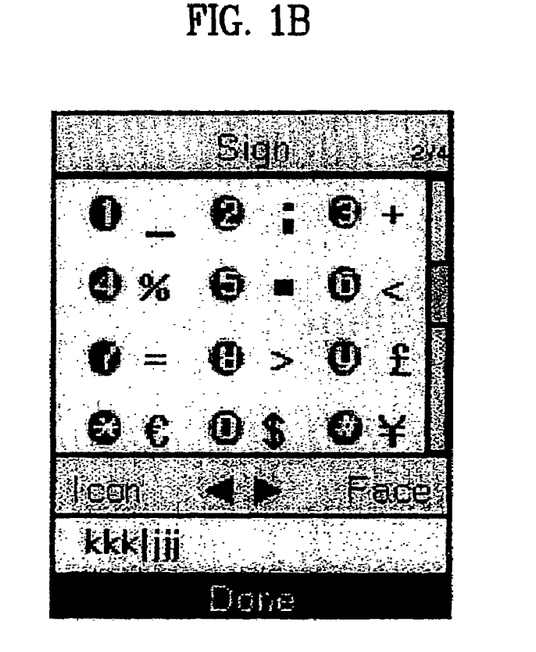
Figure 1C:
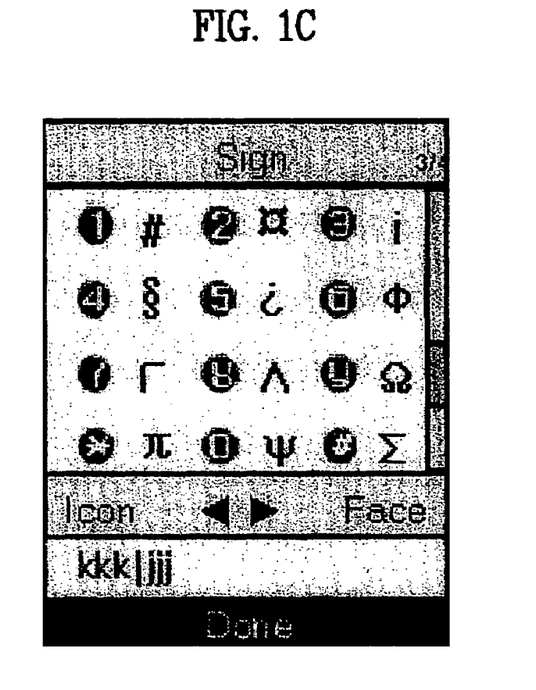
Figure 1D:
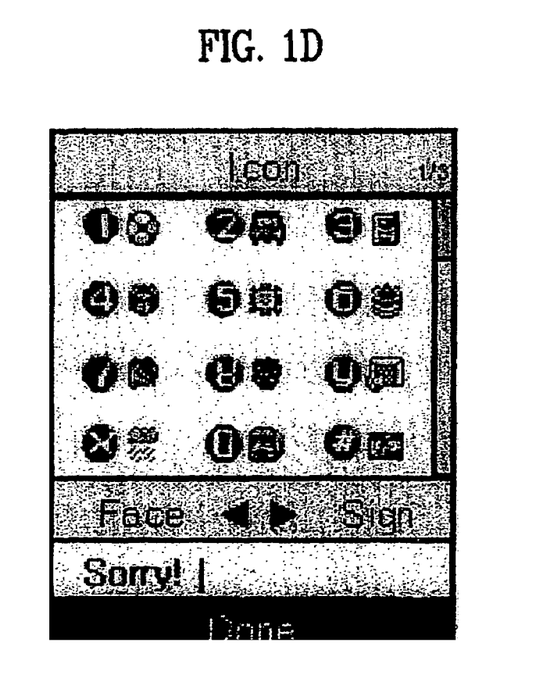
Figure 2:
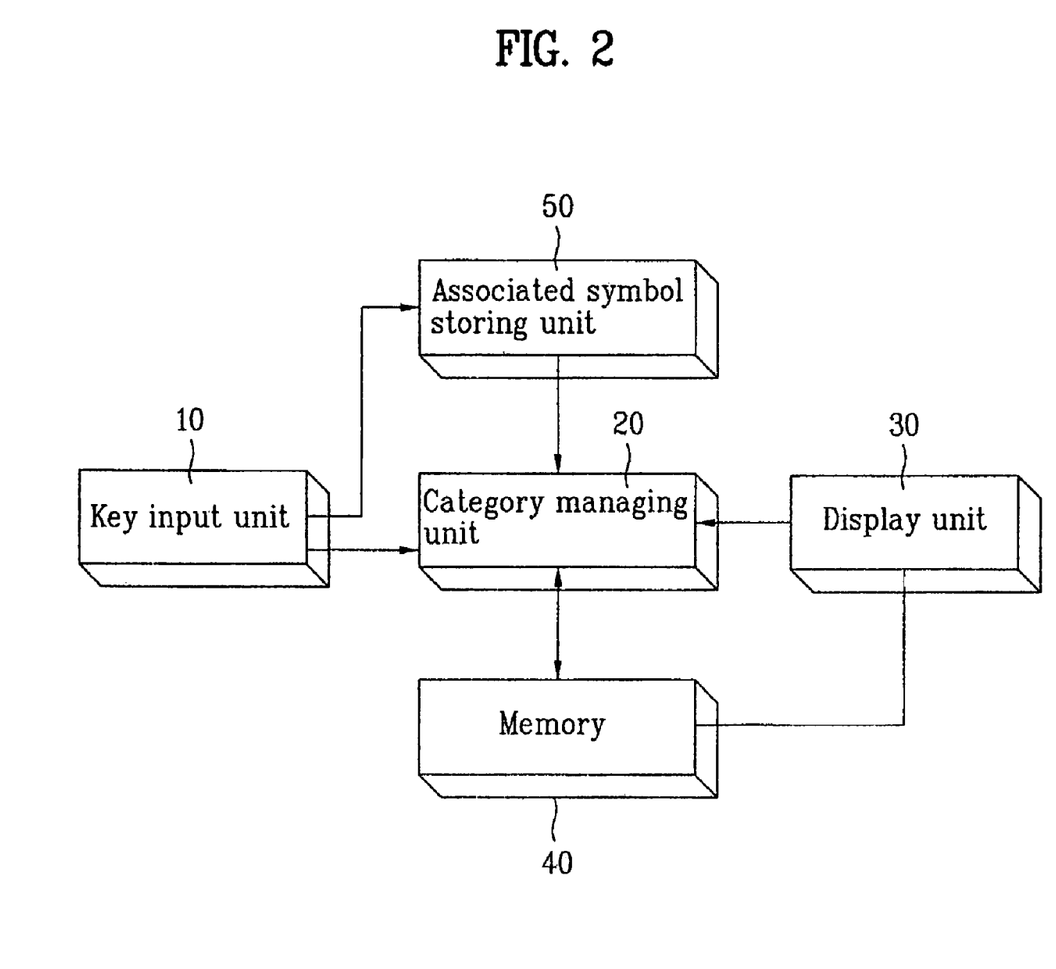
FIG. 2 is a block diagram of symbol sorting system, according to one embodiment of the invention.

Referring to FIG. 2, a symbol sorting and display system, according to an embodiment of the invention comprises a key input unit 10, a category managing unit 20, a display unit 30, a memory 40, and an associated symbol storage unit 50. The system of the invention executes assorting procedure to display symbols when a user performs a short message entry, schedule entry, memo entry, or other data entry.

The key input unit 10 comprises a keypad, for example, on which alphanumeric characters are printed. To input a specific symbol, a user interacts with the key input unit 10 to select a symbol from an input menu viewable on display unit 30. For example, a user can press one or more keys to activate the symbol input menu on the display unit 30.

Consequently, a multitude of symbols stored in the memory 40 are displayed on the display unit 30. In one embodiment, the category managing unit 20 controls the order of display of symbols on the control menu and display screen 30. Symbols are sorted into a plurality of categories according to their features and are displayed in one or more symbol sets accordingly. For example, the symbols may be sorted out into categories such as a general symbol category, picture category, diagram category, measurement category, etc.

In one embodiment, the display order of the symbol may be reconfigured by the system based on the frequency of use and relation to a previously selected symbol. That is, if one or more symbols are used often and/or together, the category managing unit 20 will remember the most frequently used symbols and will display said symbols before displaying other symbols stored in memory 40. As such, said symbols are assigned a higher priority level and may be included separately in a priority symbol set, for example, that is displayed prior to all other symbol sets.

In another embodiment, after a user selects a first symbol, category managing unit 20 determines a priority category set that includes symbols related to the first symbol. That is, the category managing unit 20 examines the first symbol to determine to which category the first symbol belongs. Then, when the user wants to select another symbol, the category managing unit 20 causes the respective symbol set for the corresponding category to be displayed.

For example, if the first symbol selected by the user belongs to a set under picture category, then the next time the user interacts with the mobile terminal to select a symbol, the symbols or sets in the picture category are displayed first, for example, even though the normal order of display would be to display the general symbol set first.

Depending on implementation, several levels of related category sets may be displayed in particular orders. In one embodiment, for example, if the first selected symbol is from category A, then category managing unit 20 causes a symbol set for category A symbols to be displayed first. If the displayed set is not a symbol set from which the user wants to select a symbol, then category managing unit 20 causes a symbol set for category B symbols to be displayed, where category B is related or associated to category A, and so on, according to the order of priority associated with the various symbol sets.

In one embodiment, a set in high priority category is stored in the associated symbol storage unit 50. For example, the selected symbol may be included in a first priority category and after the user has selected the first symbol, a second symbol expected to be related to the first symbol is included in the first priority category. A second symbol, or an associated symbol, is determined as related to the first symbol either based on a predefined relationship (e.g., both symbols belong to a picture category) or based on a serial relationship (e.g., the second symbol has an ASCII value or other serial reference value that is closely related to a respective reference value assigned to the first symbol).

Accordingly, once a user selects a first symbol, the associated symbols are registered to the priority category. Preferably, in configuring the priority category, if a user selects one symbol-A, at least one associated symbol-B, expected to be used together with the selected signal-A, is included in the priority category so as to be registered to preferred position in the priority category.

In case that a user selects the symbol-B, a priority of symbols in the next displayed priority category is decided by placing the former selected signal-A in a preferred order and the signal-B in a next preferred order. That is, it is assumed if a user selects a symbol-A, the symbol-B will follow.

In one embodiment, if the user requests another symbol input by initiating another task, order of display of symbol sets is adjusted in the priority category, such that the symbol-A is placed in the most preferred order and symbol-B is placed at the next preferred order, for example.

In the following, exemplary symbols are discussed for the purpose of illustration. It is noteworthy, however, that in various implementation and depending on user selection other symbols may be used in other embodiments of the invention.

Thus, for example, if a user selects a symbol '<', it is highly probable that a symbol '>' as a associated symbol to the symbol '<' will be selected after selection of the symbol '<'. Hence, the selected symbol and its associated symbol are assigned a priority category together. That is, '>' is assigned to the most preferential position in the priority category. If the user selects '>' as expected, '<' and '>' are subsequently assigned to a first priority order and a second priority order in the priority category, respectively.

As another example, if a user selects a symbol 'ⓑ', it is highly probable that serial symbols 'ⓐ' or 'ⓒ' that are serially related to the symbol 'ⓑ' will be used. Hence, in one embodiment, the user-selected symbol and its serial symbols are designated to a priority category. For example, if it is highly probable that symbol 'ⓒ' will be used, the symbol 'ⓒ' is registered to the most preferential position in the priority category. If a user selects symbol 'ⓒ' as expected, symbols 'ⓑ' and 'ⓒ' are subsequently registered to a first priority order and a second priority order in the priority category, respectively. In another example, if a user selects symbol 'ⓒ' as expected, symbols 'ⓐ, ⓑ, ⓒ, . . . ' are subsequently registered to sequential priority orders in the priority category, respectively to be applied to a next display.

In yet another exemplary embodiment, in selecting a symbol set such as '^*^', the symbols are selected in order of '^', '*', and '^'. Thus, once the user uses the symbol set of '^*^' a number of times, the symbol '^' is registered to a priority category and symbol '*' is designated as a associated symbol to be registered to a most preferential position in the priority category. If the user selects symbol '*', the symbol '^' is registered to the most preferential position in the priority category to be applied to a next display.

In one embodiment, when a user selects one symbol, the associated symbol storage unit 50 registers the selected/inputted symbol and/or its associated symbol to a priority category. The priority category is sorted out more preferentially that other categories. In one embodiment, the latest used one of the symbols is assigned to the priority category or its associated symbol is sorted to be placed at the most preferential position in the priority category.

The display unit 30 displays each category according under the control of the category managing unit 20. The memory 40 stores the priority category configured according to the featured categories and the history of symbols used by a user, for example.

Figure 3:
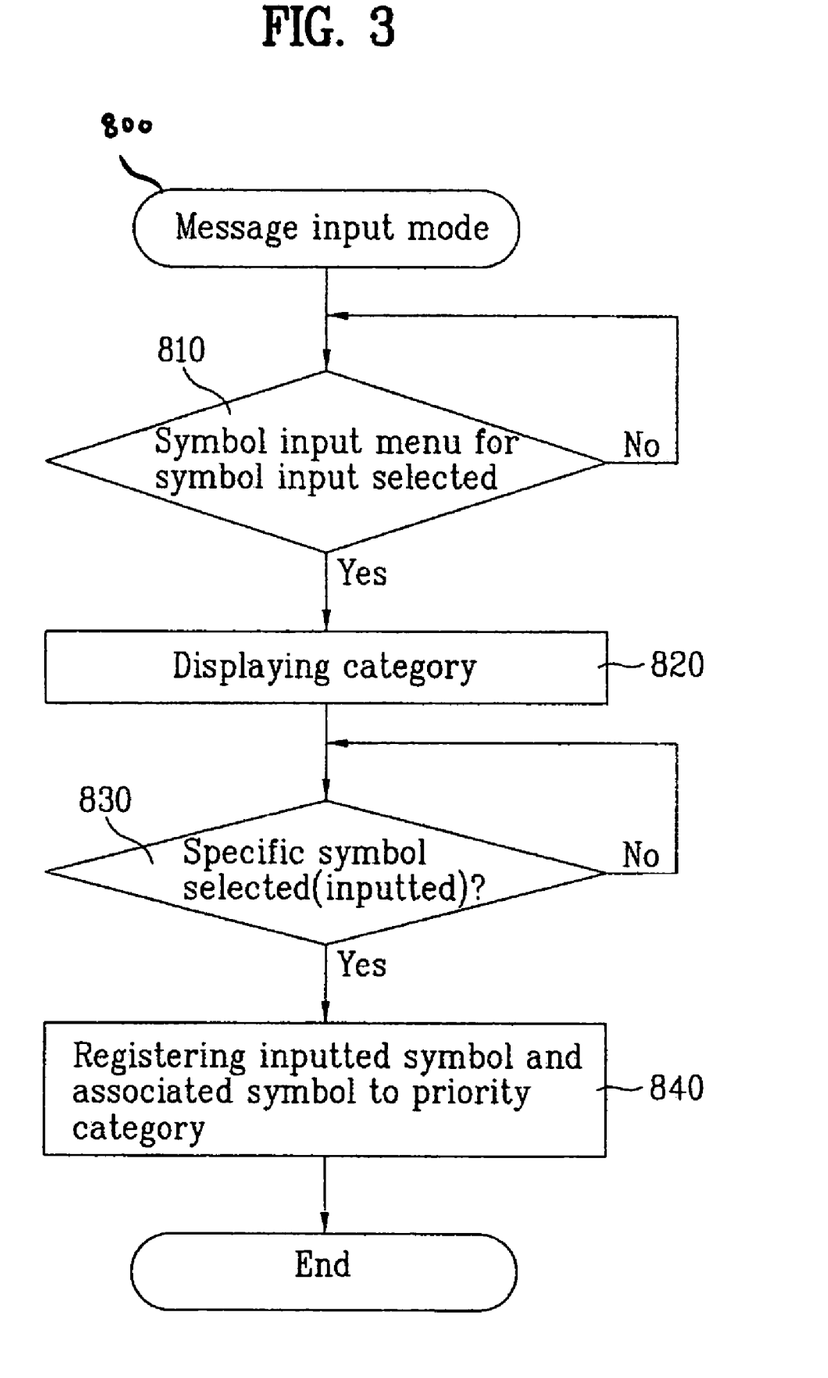
FIG. 3 is a flowchart of a method of assigning a priority level to a symbol, in accordance with one embodiment.

Referring to FIG. 3 and FIG. 4, in accordance with one embodiment, a method of sorting display symbols is provided. As shown in FIG. 3, in order for a user to input a message, the mobile terminal is switched to a message input mode (800). If the user selects a symbol input menu to select and input a symbol into a message (810), the category managing unit 20 sequentially displays symbols and categories thereof, which are stored in the memory 40 as classified by category managing unit 20, on the display unit 30 (820). In one embodiment, display categories differ from each other in priority, thus the category having a highest priority is displayed first.

When the mobile communication terminal is initially used, featured categories respectively having their predetermined priorities are sequentially displayed on the display unit 30. According to one embodiment, after a user uses specific symbols, the priority categories are changed based on the most preferential order.

In one embodiment, when the user selects a special or specific symbol from a displayed category (830), the category managing unit 20 configures a priority category including the specific symbol selected by the user. In doing so, the priority of the selected symbol is promoted to a higher level or the most preferential position.

If a priority category is configured, the category managing unit 20 registers or assigns the specific symbol selected by the user and an associated symbol to a priority category (840). In some embodiments associated symbol storage unit 50 is used to store the associated symbols of the selected symbol in a priority category. Preferably, in one embodiment, the associated symbols of the specific symbol selected by the user are registered to a first priority category. Thereafter, if the user selects the symbol menu to select another symbol, the category managing unit 20 displays the priority symbol category before the default symbol category.

Figure 4A:
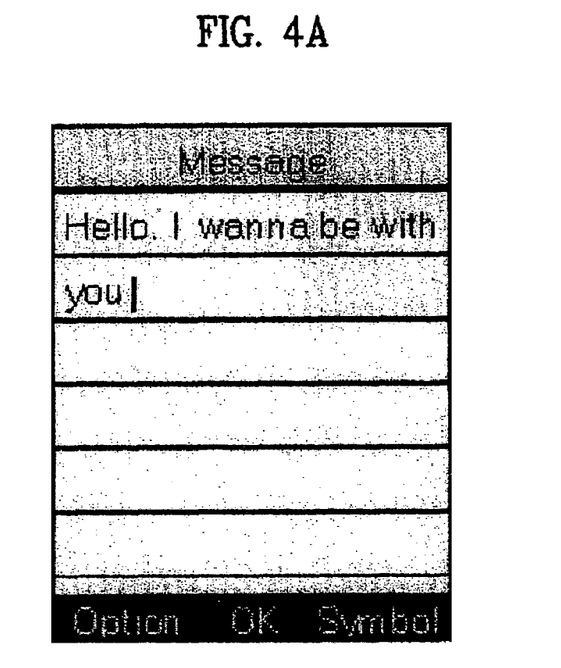
FIGS. 4A to 4D illustrate exemplary symbol menus, in accordance with one embodiment.

FIGS. 4A to 4D are diagrams of symbol sorting and display according to one embodiment of the invention. FIG. 4A shows the display content when the mobile communication terminal is in a message input mode for editing a short message. In this mode, a user interacts with key input unit 10 on mobile terminal to activate a symbol menu, for example, by selecting a "symbol" button, as shown.

Figure 4B:
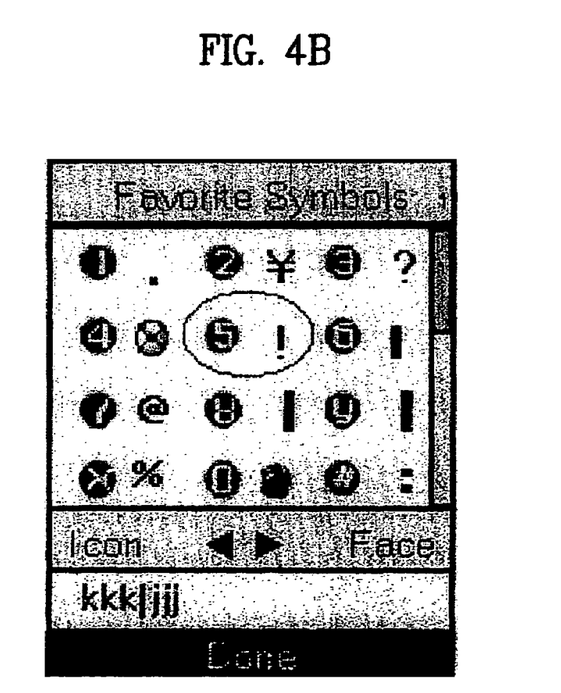
Figure 4C:
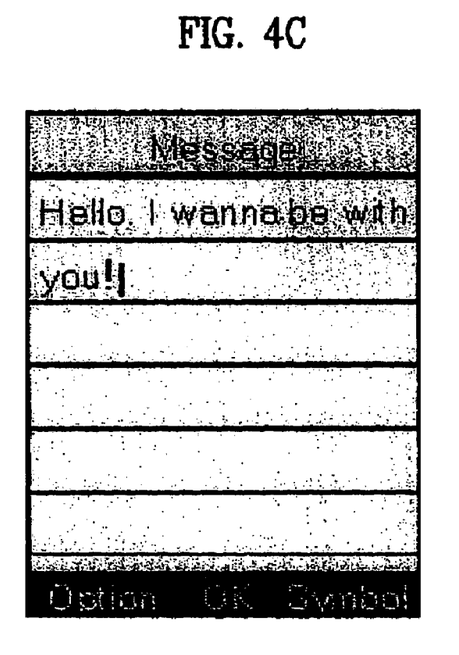
Figure 4D:
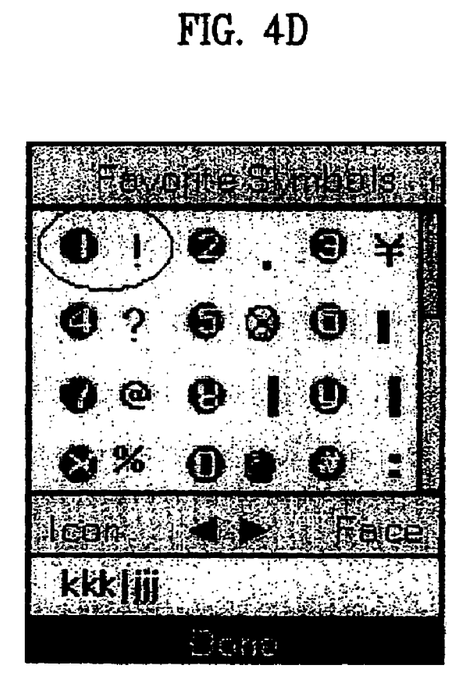

Referring to FIG. 4B, for example, the user may select an exclamation mark '!' symbol to end a text message, by pressing the number 5 key on the keypad, for example. Thereafter, based on a use history, a priority category symbol list (e.g., 'Favorite Symbols') is displayed. The user may interact with a direction key, for example, to view another symbol list, whereby featured categories having previously determined priorities are displayed according to their priorities, for example. If no use history is available, featured categories having previously determined priorities are displayed according to their priorities, respectively.

In one embodiment, after a user has used a symbol, the symbol is registered or assigned to the most prominent or highest position in the priority category. For example, the exclamation mark is promoted from fifth position, as shown in FIG. 4B to the first position in FIG. 4D. As one symbol is arranged in the most prominent position of the priority category, another symbol included in a previous priority category may be deleted from the corresponding priority category. In such a case, if the symbol not included in the priority category prior to the corresponding sorting is included in the corresponding priority category, one symbol arranged in at a least lower position is deleted from the priority category.

Moreover, in case that one symbol included in the featured category is assigned to a priority category, the corresponding symbol is not deleted from the featured category. In other words, the priority category is a separate category newly configured according to the history of user's symbol use.

In one embodiment, a specific symbol may be assigned to the priority category together with the foregoing described associated symbols. In doing so, symbols are deleted from the priority category as many as the symbol registered to the priority category by the user's optional use and associated symbols with the registered symbol.

For example, if a user selects a symbol '{' not previously included in a priority category, a correspondent symbol '}' to '{' is registered to the priority category also. If the symbol '}' had been included in a previous priority category, another symbol at a lower position is deleted from the priority category. For example, where the symbol '}' has a priority next to that of the symbol '{', the symbol '{' is arranged at a first priority position in the priority category and the correspondent symbol '}' is placed at a second priority position next to the first. On the other hand, if the symbol '}' fails to be included in the previous priority category, two symbols at least lower positions are deleted from the priority category.

In another exemplary embodiment, if a user lately uses a symbol '{' not previously included in a priority category, a correspondent symbol '}' to '{' is registered to the priority category to have a most preferential priority. As such, the symbol '}' is arranged at a first priority position in the priority category and the correspondent symbol '}' is deleted from the priority category or is placed at a second priority position next to the first.

In yet another exemplary embodiment, if a user uses a symbol '②' not be previously included in a priority category, serial symbols '①' and '③' to the symbol '②' are registered to the priority category altogether. If the user selects the symbol '②', it is highly probable that a user subsequently selects the symbols '①' and '③'.

For example, if a user uses a symbol '②' not previously included in a priority category, serial symbols '①' and '③' to the symbol '②' are registered to the priority category. Either the symbol '①' or the symbol '③' has a most preferential priority. The symbol '③' is arranged at a first priority position in the priority category since it is highly probable that the symbol '③' is used right after using the symbol '②'. The symbol '②', which has been already used, is deleted from the priority category or is sorted to be placed at the priority position next to those of the serial symbols failing to be used yet.

In one embodiment, the number of the serial symbols to the specific symbol may be directly set up by a user. The system sets one or more symbols related to the specific symbol is set up to be registered together with the specific symbol.

In another embodiment, a user selects one symbol from the previously stored symbols via key operation, the selected symbol is used in a short message (or, schedule storage, memo entry, etc.). A priority of the adopted symbol is adjusted higher than that of the previous one and the symbol is adjusted to have a highest priority. Then, the stored symbols are re-sorted according to the priority adjustment.

If the user intends to optionally input a predetermined symbol by selecting a symbol input menu later, the stored symbols, which are resorted in a manner that the used symbol is to have the highest priority, are displayed via the display unit. In adjusting the priority of the symbol adopted, a priority of a serial or correspondent symbol to the upward adjusted symbol is simultaneously adjusted.

Preferably, in the invention, a associated symbol to the symbol selected is adjusted to have a most preferential priority and the symbol selected is adjusted to have a priority next to that of the associated symbol. For example, if a user uses a symbol '{', its correspondent symbol '}' is adjusted to have a first priority that is the highest order and the symbol '{' is adjusted to have a second priority next to the first. If a user lately uses a symbol '②', at least one of associated symbols '①' and '③' to the symbol '②' is adjusted to have a first priority, for example.

In the foregoing description, one symbol (A) and its associated symbol are the most frequently used symbols after a user has selected the symbol (A). The category used in the invention corresponds to a symbol set including a multitude of symbols. Accordingly, the invention resorts the symbol hierarchy in order of priority according to symbol use history, every time user composes a short message (or, schedule or memo entry, etc.). Therefore, the invention enables a user to input symbols more quickly.

Specifically, symbols frequently used by a user are classified into a separate category so that the classified category is preferentially displayed when the user selects a first symbol. The invention enables a user to select a specific symbol with a minimum key operation, thereby reducing the time for the symbol input and minimizing waste of effort. Moreover, a associated symbol with the selected symbol selected by the user is preferably displayed for the next task.

The embodiments described above are to be considered in all aspects as illustrative only and not restrictive in any manner. Thus, other exemplary embodiments, system architectures, platforms, and implementations that can support various aspects of the invention may be utilized without departing from the essential characteristics described herein. These and various other adaptations and combinations of features of the embodiments disclosed are within the scope of the invention. The invention is defined by the claims and their full scope of equivalents.

What is claimed is:

1. A method of arranging symbols for display on a computing device, the method comprising:
    activating a symbol input menu on a display of the computing device to receive at least one symbol;
    selecting a first symbol from one of a plurality of categories in response to a first input for selecting the first symbol;
    assigning a first display priority to the first symbol in response to the first input;
    assigning a second display priority to a second symbol in response to the first input, wherein the second symbol is associated with the first symbol based on a user's use history of the first and second symbols together;
    displaying a first symbol set with a first priority category to which the first symbol belongs; and
    displaying the second symbol in the first symbol set according to the second display priority in response to a second input for selecting a symbol after the first display priority has been assigned to the first symbol,
    wherein the first and second symbols are special symbols and the second symbol is a symbol most frequently selected by the user in association with the first symbol according to the use history.

2. The method of claim 1, wherein when the second symbol is selected by the user in association with the first symbol, the use history is updated and the updated use history is registered.

3. The method of claim 1, wherein the first and second symbols are frequently selected in sequence by the user to convey a meaning according to the user's use history.

4. The method of claim 1, wherein the second display priority is closely associated with the first display priority when the second symbol is selected after the first symbol.

5. The method of claim 1, further comprising:
    displaying a symbol set containing the second symbol, in response to a request by the user for selecting another symbol.

6. The method of claim 1, wherein the second display priority is a highest display priority in the first symbol set.

7. The method of claim 1, wherein the first display priority is a highest display priority in the first symbol set, when the second symbol is selected by the user.

8. The method of claim 1, further comprising:
    moving the first symbol to a most preferential position in the first symbol set; and
    moving the second symbol or a symbol selected after the first symbol to a position next to the most preferential position in the first symbol set.

9. A method for arranging a plurality of symbols in a mobile communication terminal configured to display a plurality of symbol sets, each of the plurality of symbol sets comprising the plurality of symbols in one of a plurality of priority categories, the method comprising:
    configuring the plurality of priority categories based on a user's use history or frequency of symbol use and relation to a symbol previously selected by the user;
    assigning a first priority category to a first symbol based on the use history of the first symbol;
    adding the first symbol to a first set of the plurality of symbol sets based on the first priority category;
    displaying symbols assigned to the first priority category when the first symbol is selected;
    adding a second symbol associated with the first symbol to the first set of the plurality of symbol sets in response to a selection of the first symbol; and
    displaying the second symbol in a most prominent position in the first set of the plurality of symbol sets,
    wherein the symbols are special symbols and the second symbol is a symbol most frequently selected by the user in association with the first symbol according to the use history.

10. The method of claim 9, wherein the second symbol is associated with the first symbol by way of a serial reference value that is closely related to a serial reference value for the first symbol.

11. The method of claim 10, wherein the second symbol is assigned to a priority position and displayed in a more prominent position than the first symbol in the first set of the plurality of symbol sets.

12. The method of claim 10, wherein the second symbol is assigned to a priority position higher than a priority position of the first symbol.

13. The method of claim 9, wherein the first set of the plurality of symbol sets comprises a plurality of symbols associated with each other based on the use history.

14. The method of claim 13, wherein when the first symbol is selected from the first set of the plurality of symbol sets, remaining symbols in the first set of the plurality of symbol sets are sorted to be displayed according to the use history of each remaining symbol in conjunction with the first symbol.

15. A mobile communication terminal having a system for arranging symbols for display and selection, the terminal comprising:
   a user interface for selecting a first symbol having a first display priority; and
   means for assigning a second display priority to a second symbol associated with the first symbol in response to a selection of the first symbol, wherein the second symbol is associated with the first symbol based on a user's use history of the first and second symbols together and displayed according to the second display priority, in response to an input for displaying a symbol set,
   wherein the symbols are special symbols and the second symbol is a symbol most frequently selected by the user in association with the first symbol according to the use history.

16. The terminal of claim 15, wherein when the second symbol is selected by the user in association with the first symbol, the use history is updated and the updated use history is registered.

17. The terminal of claim 15, further comprising:
   means for configuring a priority category comprising the first and second symbols.

18. The terminal of claim 15, wherein the first and second symbols are frequently selected in sequence by the user to convey a meaning according to the use history.

19. The terminal of claim 15, wherein the second display priority is closely associated with the first display priority, when the second symbol is selected after the first symbol.

20. The terminal of claim 15, further comprising:
   means for displaying a symbol set containing the second symbol, in response to an input for selecting another symbol.

21. The terminal of claim 15, wherein the second display priority is a highest display priority in the symbol set.

22. The terminal of claim 15, wherein the first display priority is a highest display priority in the symbol set when the second symbol is selected.

23. The method of claim 1, wherein the special symbols comprise a sign, an icon, or an emoticon.

24. The method of claim 1, wherein the symbols are sorted into categories comprising general symbol, picture, diagram, and measurement categories.

25. The method of claim 1, wherein the symbols are typed together with text symbols including numbers and alphabets in a message.

26. The method of claim 1, wherein the first and the second symbols are selected to be input as a symbol set comprising at least two symbols.

27. The method of claim 1, wherein the first and second symbols are selected only from the symbol input menu viewable on the display and are not provided on an input unit of the computing device, the special symbols excluding alphanumeric characters that are directly selected from the input unit.

28. The method of 9, wherein the plurality of symbol sets comprise at least one symbol set determined the user.

* * * * *